Jan. 4, 1955 — F. K. KNOHL — 2,698,472
SNAP-IN FASTENER
Filed May 19, 1951 — 2 Sheets-Sheet 1
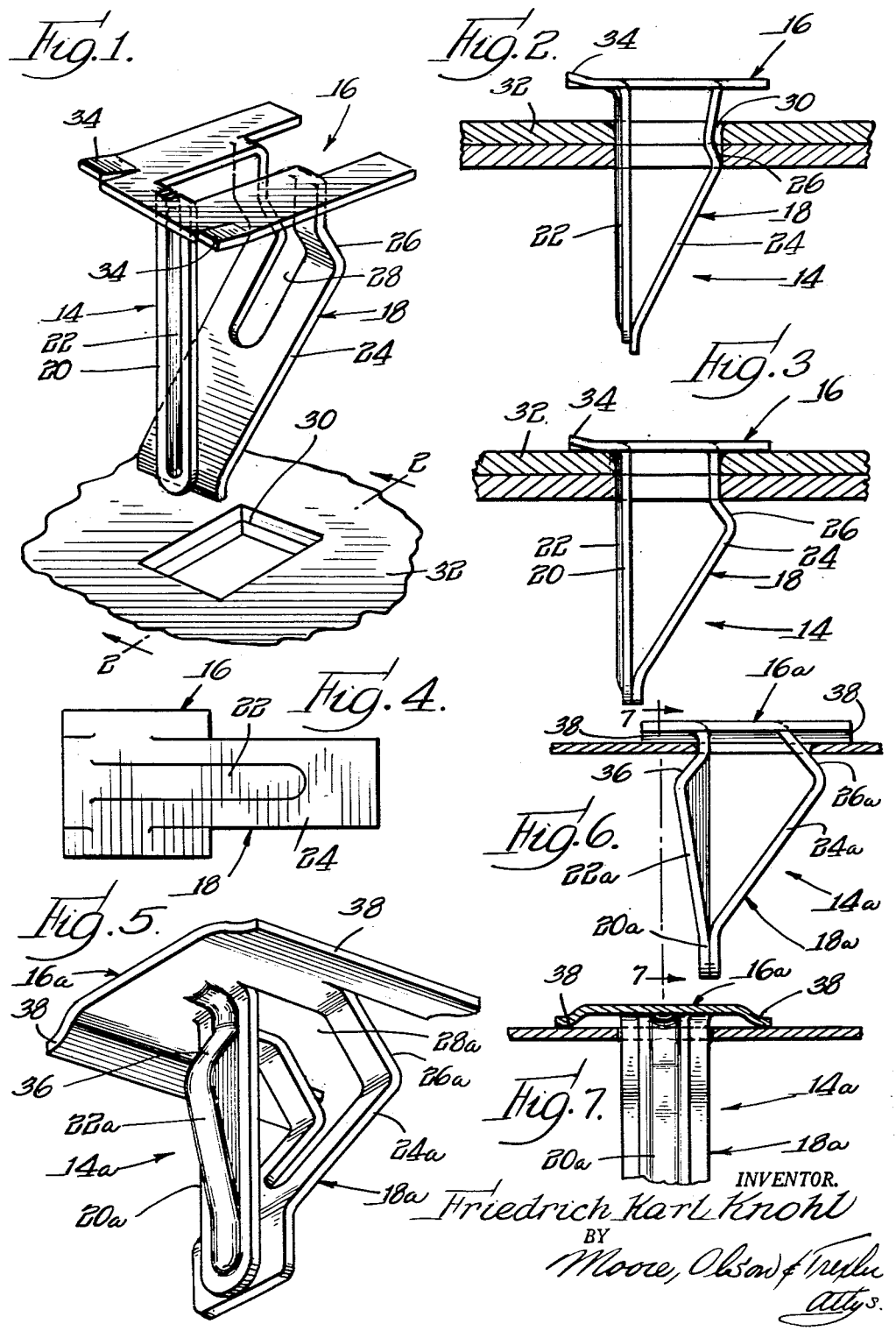

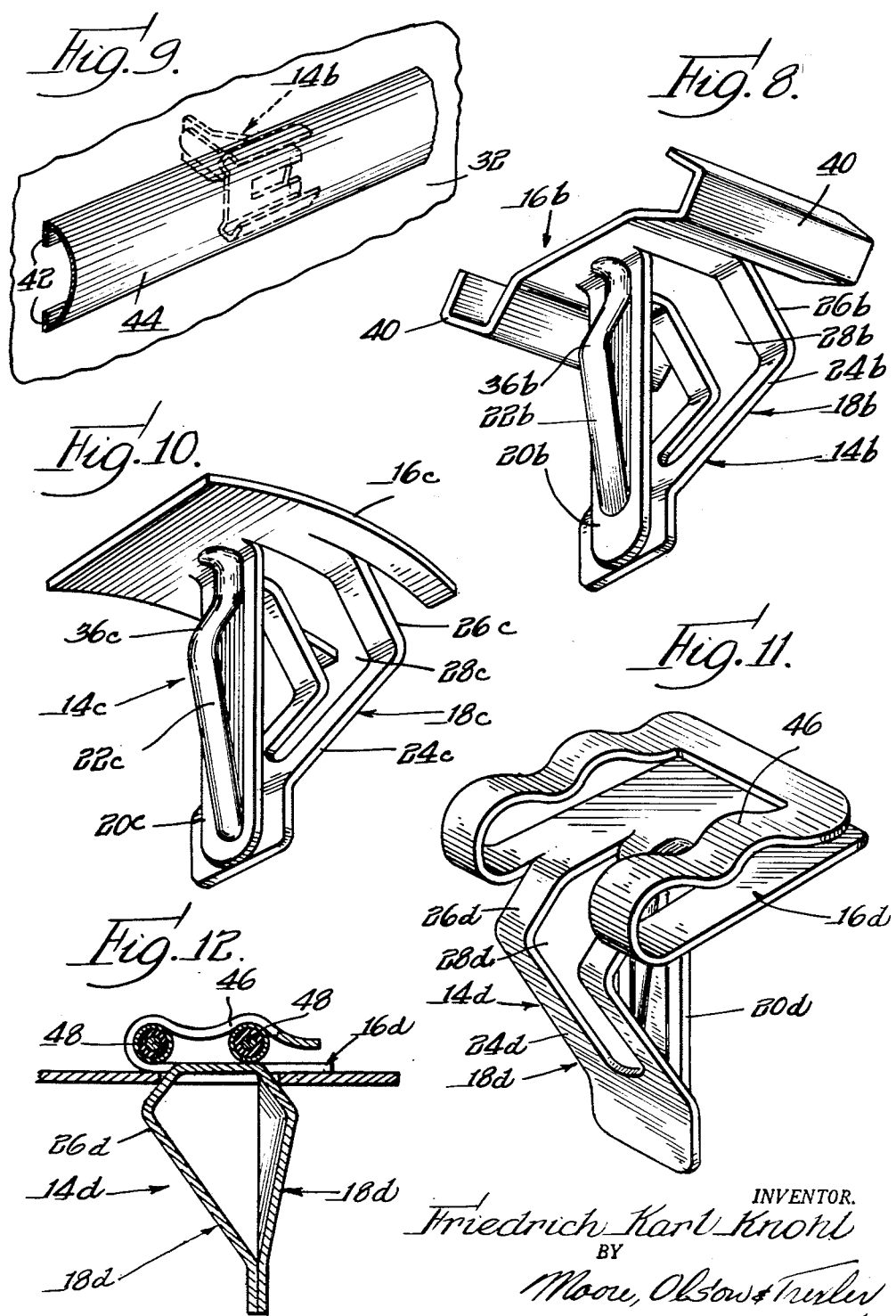

United States Patent Office 2,698,472
Patented Jan. 4, 1955

2,698,472

SNAP-IN FASTENER

Friedrich K. Knohl, Chicago, Ill., assignor to Illinois Tool Works, Chicago, Ill., a corporation of Illinois Application May 19, 1951, Serial No. 227,224

4 Claims. (Cl. 24—213)

This invention relates generally to fasteners, and more particularly to fasteners of the snap-in type consisting of a headed shank designed to be snapped into a work aperture.

The present invention is concerned with the provision of a fastener which may be produced from a single strip of sheet metal stock by the practice of economical stamping and forming operations.

More specifically, the present invention contemplates a snap-in type fastener having a novel shank construction of improved practical design.

It is an object of the present invention to provide a fastener of the type set forth above, wherein the novel shank construction includes a plurality of sections, one of which is relatively rigid and the other laterally yieldable to facilitate application to a work aperture, said shank sections being so arranged as to make it possible to produce the fastener from a single relatively short length of sheet metal strip stock.

A further object of the present invention is to provide a snap-in type fastener from a minimum length of sheet metal strip stock, and to this end it is proposed to form a relatively rigid shank section from material struck from a portion of the fastener head and from a portion of a laterally or transversely yieldable shank section.

The foregoing and other objects and advantages will be more apparent from the following detailed description when considered in connection with the accompanying drawings, wherein—

Fig. 1 is a perspective view of a fastener which is representative of one embodiment of the invention, said fastener being shown in association with a fragmentary portion of a complementary apertured work piece;

Fig. 2 is a transverse sectional view taken substantially along the line 2—2 of Fig. 1 showing the fastener partially inserted within the work aperture with the laterally yieldable shank section sprung so as to cause the entering extremity thereof to slide along the complementary inner surface of the relatively rigid shank section;

Fig. 3 is a view similar to Fig. 2 showing the fastener completely inserted within the work piece or panel;

Fig. 4 is a plan view of a sheet metal blank from which the fastener of Figs. 1 to 3, inclusive, may be formed.

Fig. 5 is a perspective view showing a slightly modified form of fastener contemplated by the present invention;

Fig. 6 is a view similar to Fig. 3 showing the fastener of Fig. 5 secured to a work piece;

Fig. 7 is a vertical sectional view taken substantially along the line 7—7 of Fig. 6;

Fig. 8 is a perspective view of a further modified form of the fastener having a head designed to secure molding strips and the like in position;

Fig. 9 is a perspective view showing the fastener of Fig. 8 attached to a work sheet and holding a molding strip to the work sheet;

Fig. 10 is a perspective view of another modification wherein the fastener head is arched so as to provide resilience when the head is clamped against the work surface;

Fig. 11 discloses another modification wherein the fastener head is of U-shaped construction designed to grip work pieces; and Fig. 12 shows the fastener of Fig. 11 secured to a work piece with electrical conductors held in position by the U-shaped fastener head.

Referring now to the drawings more in detail wherein like numerals have been employed to designate similar parts throughout the various figures, it will be seen that a fastener representing one embodiment of the invention and designated generally by the numeral 14 is illustrated in Figs. 1 to 3, inclusive. This fastener 14 consists of a plate-like head portion 16 and a shank portion 18. The shank portion 18 consists of two sections. One section designated by the numeral 20 is a relatively rigid section and extends substantially normal to the plane of the head 16. It will be seen that in order to render the shank section 20 relatively rigid against forces tending to laterally displace or bend it, a longitudinal rib 22 is provided which extends to and blends, in the form of a fillet, with the underside of the head 16. Complemental to the substantially straight and relatively rigid shank section 20 is a laterally yieldable shank section 24. This shank section 24 at its free extremity is positioned adjacent the inner surface of the free extremity of the rigid shank section 20, and diverges from said rigid section as it extends toward the head to a given point axially spaced from the underside of the head 16 and then converges toward the head section to provide a work engaging shoulder 26 facing the underside of the head.

Particular attention is directed to the fact that the fastener just described may be produced from a simple single strip of sheet metal stock. In Fig. 4 a blank from which the fastener may be formed is shown. The rigid shank section 22 is struck from a portion of the material of the head 16 and from a portion of the shank section 24. By controlling the width of the shank sections, the desired degree of flexibility of the shank section 24 may be obtained. In this manner a very simple scrapless fastener is produced, reducing to a minimum the amount of stock necessary for its production. The space originally occupied by the material of the rigid shank section 22 is designated by the numeral 28 and extends longitudinally of the upper portion of the laterally yieldable shank section 24 and transversely of a portion of the head 16. Also, by removing a portion of the shank stock as described, the lateral yieldability or flexibility of the shank section 24 is enhanced.

When the shank 18 consisting of the relative rigid section 22 and the laterally yieldable section 24 is initially inserted in an aperture 30 of a work piece 32, the outer surface of the diverging portion of the shank portion 24 exerts a camming action against the work piece defining one side of the aperture 20, thereby causing the rigid shank section 22 to be urged into firm engagement with the material defining the opposite side of the work aperture. As shown in Fig. 2, the fastener has been inserted to the point of maximum lateral displacement or flexing of the shank section 24. As the fastener approaches this position, the lower or entering end of the section 24 slidably bears against the rigid section 22, and as a result moves axially downwardly or away from the head. That is to say, during this period of insertion the section 22 remains rigid, thereby requiring the free extremity of the section 24 to move axially as an incident to the lateral shifting of the upper portion of the section 24. The lateral pressure experienced by the yieldable shank section 24 upon insertion of the fastener within the work aperture is released as soon as the shoulder 26 clears the underside of the work, as clearly illustrated in Fig. 3. In the position shown in Fig. 3, the shoulder 26 cooperates to prevent unauthorized withdrawal of the fastener.

The head 16 of the fastener 14 is provided with a pair of outwardly struck resilient lugs or fingers 34. These fingers serve a useful purpose when the fastener is to be used for securing channelled strips (not shown). When the fastener is to be used for holding channelled strips in place, the fingers 34 provide resilient means for setting up frictional engagement between the crown of the molding on one side and the inner flange surface on the opposite side of the channel, thereby enabling fasteners to be spaced along the channel in any desired spaced relation.

In Figs. 5 to 7, inclusive, a slightly modified form of fastener is shown. This fastener is designated generally by the numeral 14a. The fastener 14a includes a head 16a and a shank portion 18a. The shank portion 18a comprises a relatively rigid shank section or member 22a and a laterally yieldable or resilient section 24a. The section 24a, like the previously described yieldable section 24, has an entering portion positioned within a plane substantially parallel to the shank axis and designed to slidably bear against the inner surface of the section 20a as an incident to lateral pressure experienced by the yieldable shank section 24a upon the insertion of the fastener within a work aperture. Also, like the previously described shank section 24, the section 24a diverges from the section 20a to a point spaced axially from the head 16a, and then converges toward the shank axis so as to provide a shoulder 26a. The shank section 20a is provided with a longitudinal rib 22a which not only serves to strengthen this shank section against lateral displacement or bending, but also provides a shoulder 36 which cooperates with the shoulder 26a in securing the fastener within a work position, as clearly illustrated in Fig. 6.

The head 16a is also provided with oppositely disposed flanges 38 extending toward the entering end of the fastener so as to provide the head structure with a certain degree of axial resiliency. Thus, when the head 16a is tightened against the work surface, the oppositely disposed flanges or margins will tend to yield slightly and thereby cooperate with the shoulders 36 and 26a in securing the fastener in position. The fastener 14a is applied to a work aperture in exactly the same manner as described in connection with the fastener shown in Figs. 1 to 3, inclusives. As the fastener is initially inserted the shank section 24a yields as an incident to lateral pressure experienced by said section upon engagement with the material of the work defining one side of the work aperture. The rigid ribbed shank section 20a bears against the oppositely disposed portion defining the work aperture. As a result the entering portion of the shank section 24a bears against the inner surface of the shank section 20a and slides axially in a direction away from the head so as to permit sufficient collapsing of the shank to allow ultimate insertion thereof within the work aperture.

In Figs. 8 and 9 a still further modified form of fastener is shown designated generally by the numeral 14b. This fastener 14b is similar in all respects to the fastener 14a except in the formation of the head portion 16b. Thus, the fastener 14b includes a shank 18b comprised of a relatively rigid shank section 20b and a laterally yieldable shank section 24b. The shank section 24b provides a shoulder 26b which cooperates with a shoulder 36b on the upper end of the rib 22b in securing the fastener against unauthorized removal from a work piece. The head 16b is provided on opposite margins with channel-like portions 40. The channel-like portions 40 of the head 16b are designed to engage the flange, side walls and a portion of the crown of the molding strip so that the head is secured firmly within the molding strip. The fastener may be sprung into fixed relation within the molding either prior to the application of the fastener shanks to the work apertures or after the fastener shanks have been positioned within complementary work apertures. It is important that the transverse shape of the channel-like portions 40 be such as to snugly accommodate the internal marginal surface of a molding strip.

The fastener shown in Fig. 10 represents a further modiform designated generally by the numeral 14c. This fastener 14c, like the fastener 14b, is very similar to the fastener 14a, differing only therefrom in providing a head 16c which is arched so as to provide resilient clamping engagement with one side of the work surface oppositely disposed from the side of the work piece which engages the shoulders 36c and 26c. All other parts of the fastener shank 18c are designated by numerals corresponding with those used in the previous figures except that the suffix letter "c" is employed in association with such numerals.

In Figs. 11 and 12 a fastener designated generally by the numeral 14d is shown which has a shank 18d. This shank 18d is structurally identical with the previously described shanks 18a, 18b and 18c. Corresponding numerals bearing the suffix letter "d" are applied to the various corresponding parts of the fastener 14d. Particular attention is directed to the head structure 16d. It will be noted that the head 16d, in addition to the plate-like head proper designed to engage a work surface, includes a marginal extension 46 which overlies the upper surface of the plate-like head. This extension 46 is undulated to accommodate a pair of elongated elements to be supported, such as a pair of electrical conductors 48 illustrated in Fig. 12. By having the head 16d of U-shaped form as described, means is provided for attaching the head to various types of work pieces.

From the foregoing it will be apparent that the present invention contemplates a snap-in type fastener of extremely simple and practical form. All of the forms described herein are of one-piece construction capable of being stamped and formed from a relatively short length of strip stock. By providing the combination of a relatively rigid shank section and a laterally yieldable shank section as described above, a shank structure of novel and practical design for insuring the fastener against displacement from a work piece is presented.

For the purpose of illustrating practical embodiments of the invention, certain structural forms or designs of the fastener have been disclosed herein. However, it should be understood that the invention is not limited to the specific details of construction shown in the drawings, but contemplates other modifications and changes without departing from the spirit and scope of the appended claims.

The invention is hereby described as follows:

1. A one piece snap-in sheet material fastener comprising a head portion and a shank portion, said shank portion including a relatively yieldable first shank section extending generally axially of the fastener from an integral junction with said head portion, a relatively rigid second shank section struck in part from said first shank section and extending generally axially of the fastener from an integral junction with said head portion, said shank sections having separate free entering ends substantially in juxtaposition and axially slidable relative to each other, and said yieldable shank section having a portion adjacent said head portion diverging outwardly with respect to said rigid shank section and providing shoulder means engageable with a work piece.

2. A one piece snap-in sheet material fastener comprising a head portion and a shank portion, said shank portion including a relatively yieldable first shank section extending axially of the fastener from an integral junction with said head portion, a relatively rigid second shank section struck in part from said head portion, in part from said first shank section and extending generally axially from an integral junction with said head portion, said integral junctions of said shank sections and said head portion being spaced apart, said shank sections having free entering ends substantially in juxtaposition and axially slidable relative to each other, and said yieldable shank section having a portion adjacent said head portion diverging outwardly with respect to said rigid shank section and providing shoulder means engageable with a work piece.

3. A one piece snap-in sheet material fastener comprising a head portion and a shank portion, said shank portion including a relatively yieldable first shank section extending generally axially of the fastener from an integral junction with said head portion, a relatively rigid second shank section struck in part from said head portion, in part from between margins of said first shank section and extending generally axially of said fastener from an integral junction with said head portion, said integral junctions of said shank sections and said head portion being spaced apart, said shank sections having separate free entering end portions substantially parallel to each other and in juxtaposition and axially slidable relative to each other, said relatively rigid shank section having a rigidifying bead therein extending from its junction with said head portion substantially to its free entering end, and said yieldable shank section having a portion adjacent said head portion diverging outwardly with respect to said rigid shank section and providing shoulder means engageable with a work piece.

4. A one piece snap-in sheet material fastener, as defined in claim 3, wherein said rigidifying bead has a portion thereof adjacent said head portion projecting laterally outwardly and providing shoulder means engageable with a work piece.

References Cited in the file of this patent

UNITED STATES PATENTS

| | | |
|---|---|---|
| 2,068,633 | Upham | Jan. 19, 1937 |
| 2,100,017 | Van Uum | Nov. 23, 1937 |
| 2,148,091 | Van Uum | Feb. 21, 1939 |
| 2,171,925 | Fitts | Sept. 5, 1939 |
| 2,219,382 | Conlon | Oct. 29, 1940 |
| 2,249,895 | Hall | July 22, 1941 |
| 2,249,902 | Kral | July 22, 1941 |
| 2,265,957 | Tinnerman | Dec. 9, 1941 |
| 2,329,688 | Bedford | Sept. 21, 1943 |
| 2,428,338 | Poupitch | Sept. 30, 1947 |
| 2,451,591 | Tinnerman et al. | Oct. 19, 1948 |
| 2,499,637 | Flora | Mar. 7, 1950 |
| 2,598,776 | Flora | June 3, 1952 |